(12) United States Patent
Takahashi

(10) Patent No.: US 9,641,751 B2
(45) Date of Patent: *May 2, 2017

(54) IMAGING APPARATUS, IMAGING METHOD THEREOF, AND COMPUTER READABLE RECORDING MEDIUM

(71) Applicant: OLYMPUS CORPORATION, Hachioji-shi, Tokyo (JP)

(72) Inventor: Yoshiteru Takahashi, Musashino (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/987,885

(22) Filed: Jan. 5, 2016

(65) Prior Publication Data

US 2016/0134805 A1    May 12, 2016

Related U.S. Application Data

(63) Continuation of application No. 14/066,138, filed on Oct. 29, 2013, now Pat. No. 9,258,478.

(30) Foreign Application Priority Data

Nov. 5, 2012 (JP) .................................. 2012-243842

(51) Int. Cl.
*H04N 5/232* (2006.01)
*H04N 5/262* (2006.01)
*G06T 7/20* (2006.01)

(52) U.S. Cl.
CPC ..... *H04N 5/23222* (2013.01); *H04N 5/23216* (2013.01); *H04N 5/23293* (2013.01); *H04N 5/23296* (2013.01); *H04N 5/2628* (2013.01)

(58) Field of Classification Search
CPC ... H04N 5/23296; H04N 5/23126; G06T 6/20
(Continued)

(56) References Cited

U.S. PATENT DOCUMENTS 6,977,678 B1 * 12/2005 Wada ................. G08B 13/1963
348/143
2012/0224063 A1 9/2012 Terre
2013/0259400 A1 * 10/2013 Takagi ....................... G06T 7/20
382/282

FOREIGN PATENT DOCUMENTS

JP    H09-074504 A    3/1997
JP    2001-069496 A   3/2001
(Continued)

OTHER PUBLICATIONS

Office Action issued in corresponding Japanese Patent Application No. 2012-243842 on Jul. 19, 2016, consisting of 5 pp. (English Translation Provided).

(Continued)

*Primary Examiner* — Hee-Yong Kim
(74) *Attorney, Agent, or Firm* — Volpe and Koenig, P.C.

(57) ABSTRACT

An electronic device including an imaging device that captures an image of an object and generates image data of the object, a tilt angle detector that detects a tilt angle of the imaging device with respect to a horizontal plane, an azimuth detector that detects an azimuth angle between a reference orientation based on a preset orientation and an optical axis of the imaging device, and a display controller that causes a display to display target information indicating a direction to a target position for instructing a position of a capturing area of the imaging device in an image corresponding to the image data, with the optical axis of the imaging device being a reference, based on the tilt angle (Continued)

detected by the tilt angle detector and the azimuth angle detected by the azimuth detector.

8 Claims, 13 Drawing Sheets

(58) Field of Classification Search
USPC .......................................................... 348/169
See application file for complete search history.

(56) References Cited

FOREIGN PATENT DOCUMENTS

| | | |
|---|---|---|
| JP | 2002-314851 A | 10/2002 |
| JP | 2007-074143 A | 3/2007 |
| JP | 2009-130592 A | 6/2009 |
| JP | 2009-224890 A | 10/2009 |
| JP | 2010-004381 A | 1/2010 |
| JP | 2012-085223 | 4/2012 |
| JP | 2012-169714 | 9/2012 |

OTHER PUBLICATIONS

Office Action issued is corresponding Japanese Patent Application No. 2012-243842 on Sep. 27, 2016, consisting of 6 pp. (English Translation Provided).

* cited by examiner

IMAGING APPARATUS, IMAGING METHOD THEREOF, AND COMPUTER READABLE RECORDING MEDIUM

CROSS-REFERENCE TO RELATED APPLICATION

This application is a continuation of U.S. patent application Ser. No. 14/066,138, filed Oct. 29, 2013, which is based upon and claims the benefit of priority from Japanese Patent Application No. 2012-243842, filed on Nov. 5, 2012, the entire contents of which are incorporated herein by reference.

BACKGROUND OF THE INVENTION

1. Field of the Invention

The present invention relates to an imaging apparatus that captures an image of an object and generates image data of the object, an imaging method of the imaging apparatus, and a computer readable recording medium.

2. Description of the Related Art

A monitor camera, having a dome-shaped housing in which an imaging apparatus such as a digital camera and a rotation table that is able to rotate the imaging apparatus by 360 degrees in a horizontal plane and/or 180 degrees in a vertical plane are accommodated, has been known (for example, see Japanese Laid-open Patent Publication No. 2001-69496). In this technique, the imaging apparatus calculates amounts of rotation in the horizontal plane and the vertical plane based on rotation angles in the horizontal plane and the vertical plane from a current position of the imaging apparatus to a specified target position, and the rotation table is driven according to the calculated amounts of rotation, so that the imaging apparatus is moved to the target position by the shortest distance.

SUMMARY OF THE INVENTION

An imaging apparatus according to an aspect of the present invention includes: an imaging unit that captures an image of an object and generates image data of the object; a display unit that displays an image corresponding to the image data generated by the imaging unit; a tilt angle detecting unit that detects a tilt angle of the imaging apparatus with respect to a horizontal plane; an azimuth detecting unit that detects an azimuth angle between a reference orientation based on a preset orientation and an optical axis of the imaging apparatus; a target position setting unit that sets, in the image displayed by the display unit, a target position to be a target for instructing a position of a capturing area of the imaging apparatus; and a display control unit that causes the display unit to display target information indicating a direction to the target position with the optical axis of the imaging apparatus being a reference, based on the tilt angle detected by the tilt angle detecting unit and the azimuth angle detected by the azimuth detecting unit.

An imaging method according to another aspect of the present invention includes: detecting a tilt angle of the imaging apparatus with respect to a horizontal plane; detecting an azimuth angle between a reference orientation based on a preset orientation and an optical axis of the imaging apparatus; setting, in the image displayed by the display unit, a target position to be a target for instructing a position of a capturing area of the imaging apparatus; and causing the display unit to display target information indicating a direction to the target position with the optical axis of the imaging apparatus being a reference, based on the tilt angle and the azimuth angle.

A non-transitory computer readable recording medium according to another aspect of the present invention has an executable computer program recorded thereon, the computer program instructing a processor of an imaging apparatus, including an imaging unit that captures an image of an object and generates image data of the object and a display unit that displays an image corresponding to the image data generated by the imaging unit, to execute: detecting a tilt angle of the imaging apparatus with respect to a horizontal plane; detecting an azimuth angle between a reference orientation based on a preset orientation and an optical axis of the imaging apparatus; setting, in the image displayed by the display unit, a target position to be a target for instructing a position of a capturing area of the imaging apparatus; and causing the display unit to display target information indicating a direction to the target position with the optical axis of the imaging apparatus being a reference, based on the tilt angle and the azimuth angle.

The above and other features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
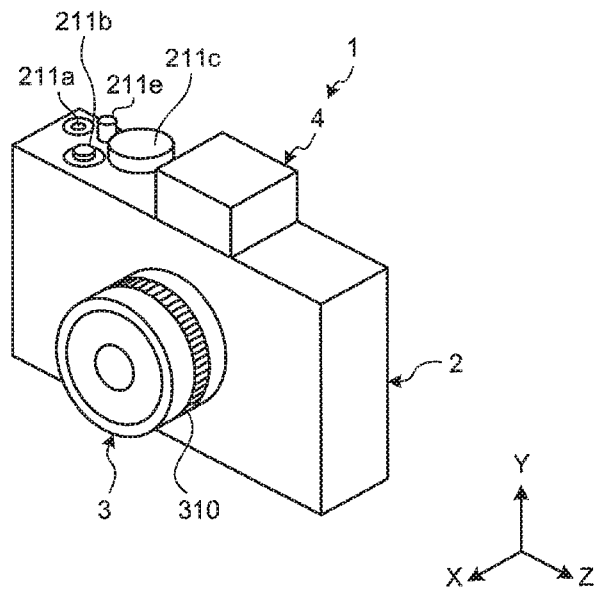
FIG. 1 is a diagram illustrating a configuration of a side, which faces an object, of an imaging apparatus according to an embodiment of the invention.

An embodiment of the present invention will be described below with reference to drawings. Furthermore, the invention is not limited to the following embodiment. In addition, the same components will be denoted by the same reference numerals in the description of the drawings.

Figure 2:
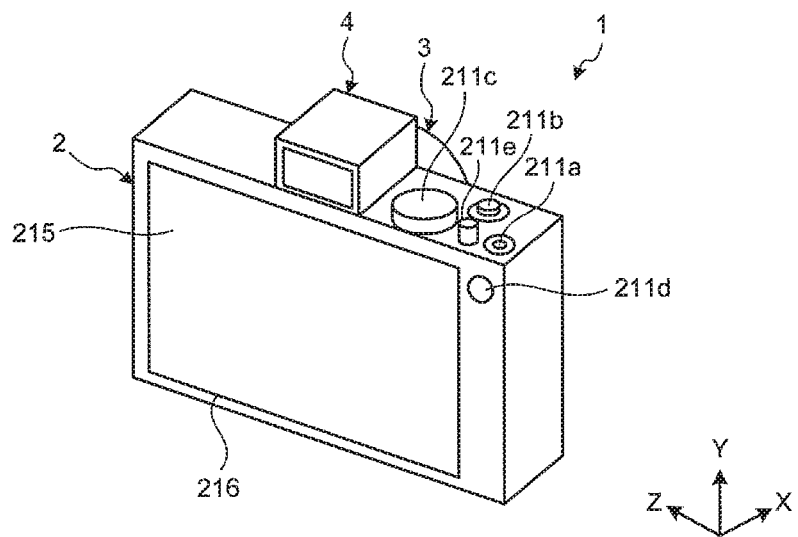
FIG. 2 is a diagram illustrating a configuration of a side, which faces a user, of the imaging apparatus according to the embodiment of the invention.
Figure 3:
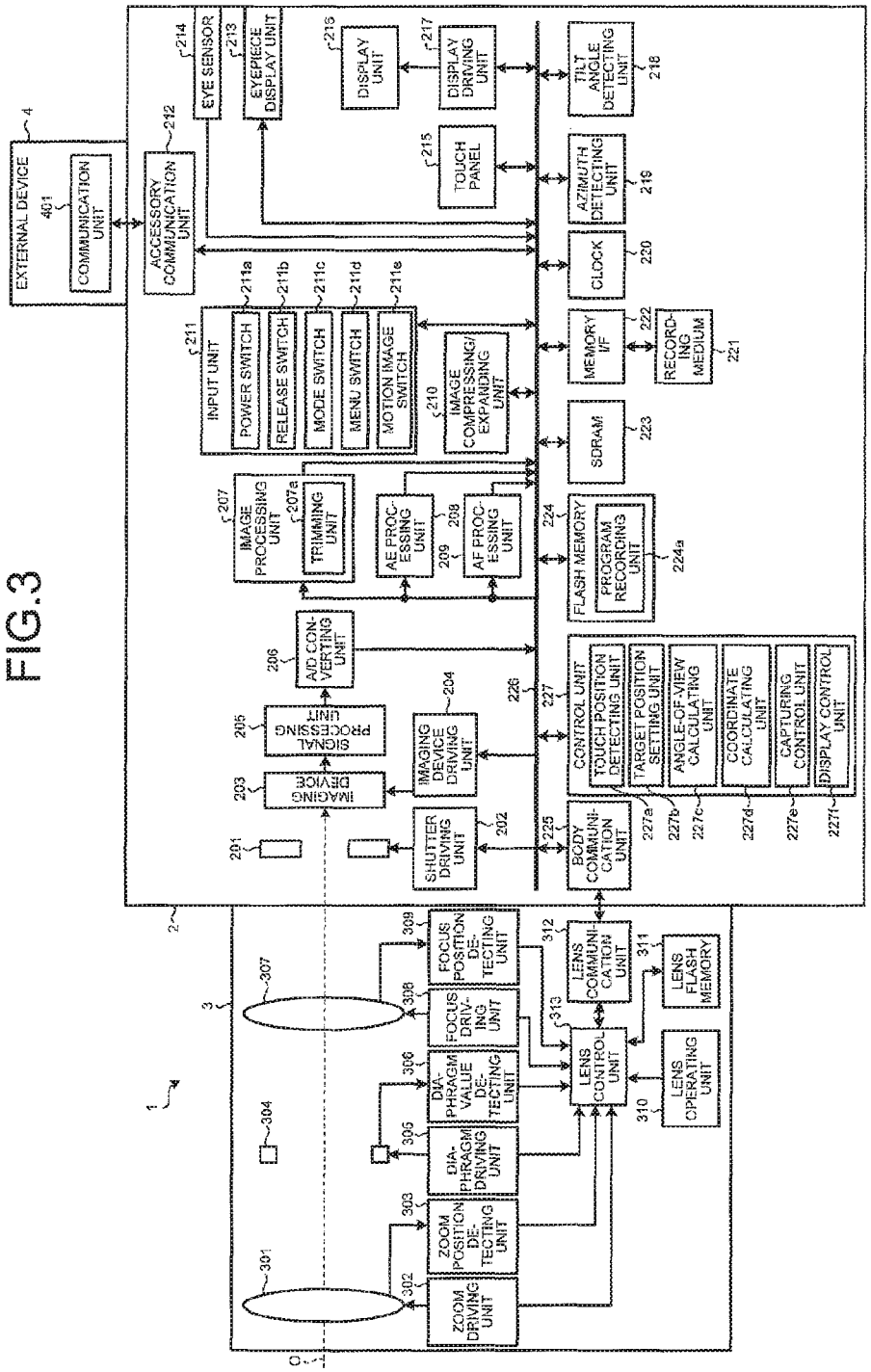
FIG. 3 is a block diagram illustrating a functional configuration of the imaging apparatus according to the embodiment of the invention.

FIG. 1 is a diagram illustrating a configuration of a side (front side), which faces an object, of an imaging apparatus according to an embodiment of the invention. FIG. 2 is a diagram illustrating a configuration of a side (rear side), which faces a user, of the imaging apparatus according to the embodiment of the invention. FIG. 3 is a block diagram illustrating a functional configuration of the imaging apparatus according to the embodiment of the invention. In FIGS. 1 to 3, as a specific coordinate system of the imaging apparatus, it is assumed that a thickness direction of the imaging apparatus is an X-axis, a vertical direction of the imaging apparatus is a Y-axis, and a width direction of the imaging apparatus is a Z-axis.

An imaging apparatus 1 illustrated in FIGS. 1 to 3 includes a main body 2, a lens unit 3 which is detachably attached to the main body 2 and has an optical zoom function while collecting light from a predetermined viewing field area, and an external device 4 which is detachably attached to the main body 2.

First, the main body 2 will be described. The main body 2 includes a shutter 201, a shutter driving unit 202, an imaging device 203, an imaging device driving unit 204, a signal processing unit 205, an A/D converting unit 206, an image processing unit 207, an AE processing unit 208, an AF processing unit 209, an image compressing/expanding unit 210, an input unit 211, an accessory communication unit 212, an eyepiece display unit 213, an eye sensor 214, a touch panel 215, a display unit 216, a display driving unit 217, a tilt angle detecting unit 218, an azimuth detecting unit 219, a clock 220, a recording medium 221, a memory I/F 222, an SDRAM (Synchronous Dynamic Random Access Memory) 223, a Flash memory 224, a body communication unit 225, a bus 226, and a control unit 227.

The shutter 201 performs an operation of setting the imaging device 203 to an exposure state or a light-blocked state. The shutter driving unit 202 drives the shutter 201 in response to an instruction signal which is input from the control unit 227. The shutter driving unit 202 is configured using, for example, a stepping motor or a DC motor.

The imaging device 203 receives light which is collected by the lens unit 3 and performs a photoelectric conversion on the received light to generate electronic image data. Specifically, the imaging device 203 is configured using, for example, a CCD (Charge Coupled Device) or a CMOS (Complementary Metal Oxide Semiconductor) which receives the light collected by the lens unit 3 and converts the received light into an electric signal, thereby generating image data of the object. The imaging device driving unit 204 outputs the image data (analog signal) to the signal processing unit 205 from the imaging device 203 at a predetermined timing. In this sense, the imaging device driving unit 204 functions as an electronic shutter.

The signal processing unit 205 performs an analog process such as a reset noise reduction process, a waveform shaping process, and a gain-up process on the image data input from the imaging device 203 and outputs the analog-processed image data to the A/D converting unit 206.

The A/D converting unit 206 performs an A/D conversion on the analog image data which is input from the signal processing unit 205 to generate digital image data (RAW data) and outputs the generated digital image data to the SDRAM 223 through the bus 226.

The image processing unit 207 acquires the image data (RAW data) from the SDRAM 223 through the bus 226, performs various types of image processes on the acquired image data, and then outputs the processed image data to the SDRAM 223. Here, examples of the image process include, for example, an optical black reduction process, a white balance adjustment process, a color matrix computation process, a gamma correction process, a color reproduction process, an edge enhancement process, a synthesis process for synthesizing a plurality of image data items, and a synchronization process of image data in a case where the imaging device 203 is a Bayer array. In addition, the image processing unit 207 includes a trimming unit 207a.

The trimming unit 207a cuts out a predetermined area of an image corresponding to the image data under the control of the control unit 227 to generate the trimming image. In addition, the trimming unit 207a cuts out an area including a target designated position from the image data in response to the instruction signal which is input from the input unit 211 or the position signal which is input from the touch panel 215 to generate the trimming image.

The AE processing unit 208 acquires the image data, which is recorded on the SDRAM 223, through the bus 226 and sets exposure conditions when the imaging apparatus 1 captures a still image or a motion image based on the acquired image data. Specifically, the AE processing unit 208 calculates luminance from the image data and determines, for example, a diaphragm value, a shutter speed, or ISO sensitivity based on the calculated luminance to perform an automatic exposure of the imaging apparatus 1.

The AF processing unit 209 acquires the image data, which is recorded on the SDRAM 223, through the bus 226 and automatically adjusts a focal point of the imaging apparatus 1 based on the acquired image data. For example, the AF processing unit 209 takes a signal of high-frequency element from the image data and performs an AF (Auto Focus) computation process on the signal of high-frequency element to determine a focusing estimation of the imaging apparatus 1, thereby automatically adjusting the focal point of the imaging apparatus 1. Furthermore, the AF processing unit 209 may automatically adjust the focal point of the imaging apparatus 1 using a pupil division phase difference method.

The image compressing/expanding unit 210 acquires the image data from the SDRAM 223 through the bus 226, compresses the acquired image data according to a predetermined format, and outputs the compressed image data to the recording medium 221 through the memory I/F 222. Here, examples of the predetermined format include a JPEG (Joint Photographic Experts Group) type, a Motion JPEG type, and an MP4 (H. 264) type. In addition, the image compressing/expanding unit 210 acquires the image data (compression image data), which is recorded on the recording medium 221, through the bus 226 and the memory I/F 222, expands (extends) the acquired image data, and then outputs the expanded image data to the SDRAM 223.

The input unit 211 includes a power switch 211a which switches a power state of the imaging apparatus 1 to ON-state or OFF-state, a release switch 211b which receives an input of a still image release signal for providing an instruction of a still-image capturing, a mode switch 211c which switches various settings of the imaging apparatus 1, a menu switch 211d which causes the display unit 216 to display various settings of the imaging apparatus 1, and a motion image switch 211e which receives an input of a motion image release signal for providing an instruction of a motion-image capturing. The release switch 211b can be advanced and retracted by an external pressing. The release switch 211b receives an input of a first release signal of the instruction signal, which instructs a capturing preparation operation, when being half-pressed, on the other hand, the release switch 211b receives an input of a second release signal which instructs the still image capturing, when being fully pressed.

The accessory communication unit 212 is a communication interface for communicating with the external device 4 which is attached to the main body 2.

The eyepiece display unit 213 displays an image corresponding to the image data, which is recorded on the SDRAM 223, through the bus 226 under the control of the control unit 227. The eyepiece display unit 213 is configured using a liquid crystal display panel or an organic EL (Electro Luminescence) display panel, and a driving driver, for example. In this sense, the eyepiece display unit 213 functions as an electronic viewfinder (EVF).

The eye sensor 214 detects an approach of a user toward the eyepiece display unit 213 and outputs the detected result to the control unit 227. The eye sensor 214 is configured using a contact sensor or the like.

The touch panel 215 is provided so as to be superimposed on a display screen of the display unit 216. The touch panel 215 detects a touch of an object from the outside and outputs the position signal in response to the detected touch position to the control unit 227. In addition, the touch panel 215 may detect the position which is touched by the user, based on information, for example, icon image or thumb-nail image displayed by the display unit 216 and may receive an input of a selection signal, which selects the instruction signal for instructing the operation to be performed by the imaging apparatus 1, or the image in response to the detected touch position. Generally, examples of the touch panel 215 include a resistance film type, an electrostatic capacitance type, and an optical type. In the present embodiment, any type of these touch panels may be applicable.

The display unit 216 displays the image corresponding to the image data. The display unit 216 is configured using the liquid crystal display panel or the organic EL display panel, for example. The display driving unit 217 acquires the image data which is recorded on the SDRAM 223 or the image data which is recorded on the recording medium 221, through the bus 226, and causes the display unit 216 to display the image corresponding to the acquired image data. Here, examples of the image display include a recording view display that displays the image data immediately after the capturing for only a predetermined time (for example, 3 seconds), a playback display that plays back the image data recorded on the recording medium 221, and a live view display that sequentially displays a live view image corresponding to the image data which is continuously generated according to time series by the imaging device 203. In addition, the display unit 216 appropriately displays operational information of the imaging apparatus 1 and information on the capturing.

The tilt angle detecting unit 218 detects acceleration which occurs in the imaging apparatus 1 to detect a tilt angle of the imaging apparatus 1 with respect to a horizontal plane and outputs the detected result to the control unit 227. Specifically, the tilt angle detecting unit 218 is configured using a tri-axial acceleration sensor which detects acceleration elements of axial directions, respectively. Thus, the tilt angle detecting unit 218 detects a polar coordinate of the imaging apparatus 1 with respect to the horizontal plane as the tilt angle, when the user performs a tilt operation on the imaging apparatus 1.

The azimuth detecting unit 219 detects an azimuth angle (azimuth) between a reference orientation based on a preset orientation and an optical axis O of the imaging apparatus 1. Specifically, the azimuth detecting unit 219 is configured by a magnetic azimuth sensor to detect a geomagnetic vertical direction element and a geomagnetic horizontal direction element and to detect an angle between a reference orientation based on north and the optical axis O of the imaging apparatus 1, as the azimuth angle.

The clock 220 has a timing function and a determination function of shooting date and time. In order to add date and time data to the image data captured by the imaging device 203, the clock 220 outputs the date and time data to the control unit 227.

The recording medium 221 is configured using, for example, a memory card which is attached from the outside of the imaging apparatus 1. The recording medium 221 is detachably attached to the imaging apparatus 1 through the memory I/F 222. The image data, which is processed by the image processing unit 207 or the image compressing/expanding unit 210, is written onto the recording medium 221. In addition, the image data recorded by the control unit 227 is read out from the recording medium 221.

The SDRAM 223 temporarily records the image data which is input from the A/D converting unit 206 through the bus 226, the image data which is input from the image processing unit 207, and information being processed by the imaging apparatus 1. For example, the SDRAM 223 temporarily records the image data, which is sequentially output for each frame by the imaging device 203, through the signal processing unit 205, the A/D converting unit 206, and the bus 226.

The Flash memory 224 includes a program recording unit 224a. The program recording unit 224a records various programs for operating the imaging apparatus 1, various types of data which are used during the program execution, and parameters of each image process required for the operation of the image process by the image processing unit 207.

The body communication unit 225 is a communication interface for communicating with the lens unit 3 which is attached to the main body 2. The body communication unit 225 includes an electric contact point with the lens unit 3.

The bus 226 is configured using, for example, a transmission path through which the components of the imaging apparatus 1 are connected to each other. The bus 226 transmits various types of data generated inside the imaging apparatus 1 to each of the components of the imaging apparatus 1.

The control unit 227 transmits an instruction or data corresponding to each of the components of the imaging apparatus 1 in response to the instruction signal input from the input unit 211 or the position signal input from the touch panel 215 to comprehensively control the operation of the imaging apparatus 1. The control unit 227 is configured using, for example, a CPU (Central Processing Unit).

The detailed configuration of the control unit 227 will be described below. The control unit 227 includes a touch position detecting unit 227a, a target position setting unit 227b, an angle-of-view calculating unit 227c, a coordinate calculating unit 227d, a capturing control unit 227e, and a display control unit 227f.

The touch position detecting unit 227a detects an external contact position (touch position) on the touch panel 215 in response to the signal input from the touch panel 215.

The target position setting unit 227b sets a target position acting as a target (mark) for instructing the position of the capturing area of the imaging apparatus 1 within the image displayed by the display unit 216. Specifically, the target position setting unit 227b sets a center of the area corresponding to the position signal input from the touch panel 215, as the target position which acts as the target for instructing the position of the imaging area of the imaging apparatus 1.

The angle-of-view calculating unit 227c calculates a current angle-of-view of the imaging apparatus 1 based on information on the current focal distance of the lens unit 3 and a sensor size of the imaging device 203. Specifically, the angle-of-view calculating unit 227c acquires the information on the focal distance of the lens unit 3 from a lens Flash memory 311 of the lens unit 3, which will be described later, and calculates the current horizontal angle-of-view and the current vertical angle-of-view of the imaging apparatus 1 based on the acquired information on the focal distance.

The coordinate calculating unit 227d calculates coordinates of the target position which is set by the target position setting unit 227b, based on the tilt angle detected by the tilt angle detecting unit 218 and the azimuth angle detected by the azimuth detecting unit 219. In addition, the coordinate calculating unit 227d calculates four-cornered coordinates, which provide boundaries of the angle-of-view of the imaging apparatus 1 calculated by the angle-of-view calculating unit 227c which will be described later, respectively.

The capturing control unit 227e performs the control to start the capturing operation in the imaging apparatus 1, when the second release signal is input from the release switch 211b. Here, the capturing operation in the imaging apparatus 1 represents an operation in which the signal processing unit 205, the A/D converting unit 206, and the image processing unit 207 perform a predetermined process on the image data which is output from the imaging device 203 by the driving of the shutter driving unit 202 and the imaging device driving unit 204. The image data processed in this way is compressed by the image compressing/expanding unit 210 under the control of the capturing control unit 227e and then is recorded on the recording medium 221 through the bus 226 and the memory I/F 222.

The display control unit 227f causes the display unit 216 and/or the eyepiece display unit 213 to display the image corresponding to the image data. Specifically, the display control unit 227f causes the eyepiece display unit 213 to display the live view image corresponding to the image data when the power of the eyepiece display unit 213 is in ON-state, on the other hand, the display control unit 227f causes the display unit 216 to display the live view image corresponding to the image data when the power of the eyepiece display unit 213 is in OFF-state. In addition, the display control unit 227f causes the display unit 216 to display target information, which indicates a direction up to the target position based on the optical axis of the imaging apparatus 1, based on the tilt angle detected by the tilt angle detecting unit 218 and the azimuth angle detected by the azimuth detecting unit 219. Specifically, the display control unit 227f causes the display unit 216 and/or the eyepiece display unit 213 to display the target information when the target position is deviated from the current angle-of-view of the imaging apparatus 1. Here, the direction up to the target position represents a direction along a vertical line of the optical axis O of the imaging apparatus 1 passing through the target position and a direction toward the target position from the optical axis O. Furthermore, the display control unit 227f may cause the display unit 216 to superimposedly display an indicator or a mark relevant to the optical axis O of the lens unit 3 on the live view image.

With respect to the main body 2 having the above-described configurations, a voice input/output function, a flash function, and a communication function capable of bi-directionally communicating with the external device may be provided.

Next, the lens unit 3 will be described. The lens unit 3 includes a zoom optical system 301, a zoom driving unit 302, a zoom position detecting unit 303, a diaphragm 304, a diaphragm driving unit 305, a diaphragm value detecting unit 306, a focus optical system 307, a focus driving unit 308, a focus position detecting unit 309, a lens operating unit 310, a lens Flash memory 311, a lens communication unit 312, and a lens control unit 313.

The zoom optical system 301 is configured using one or a plurality of lenses and changes magnification of an optical zoom of the imaging apparatus 1 by moving along the optical axis O of the lens unit 3. For example, the zoom optical system 301 can change the focal distance from 12 mm to 50 mm.

The zoom driving unit 302 changes the optical zoom of the imaging apparatus 1 by allowing the zoom optical system 301 to be moved along the optical axis O, under the control of the lens control unit 313. The zoom driving unit 302 is configured using, for example, a DC motor or a stepping motor.

The zoom position detecting unit 303 detects the position of the zoom optical system 301 on the optical axis O and outputs the detected result to the lens control unit 313. The zoom position detecting unit 303 is configured using, for example, a photo interrupter.

The diaphragm 304 adjusts the exposure by restriction of the amount of incident light which is collected by the zoom optical system 301.

The diaphragm driving unit 305 changes a diaphragm value (f value) of the imaging apparatus 1 by driving the diaphragm 304, under the control of the lens control unit 313. The diaphragm driving unit 305 is configured using, for example, the stepping motor.

The diaphragm value detecting unit 306 detects the diaphragm value from the current state of the diaphragm 304 and outputs the detected result to the lens control unit 313. The diaphragm value detecting unit 306 is configured using, for example, the photo interrupter or an encoder.

The focus optical system 307 is configured using one or a plurality of lenses and changes a focus position of the imaging apparatus 1 by moving along the optical axis O of the lens unit 3.

The focus driving unit 308 adjusts the focus position of the imaging apparatus 1 by allowing the focus optical system 307 to be moved along the optical axis O, under the control of the lens control unit 313. The focus driving unit 308 is configured using, for example, the DC motor or the stepping motor.

The focus position detecting unit 309 detects the position of the focus optical system 307 on the optical axis O and outputs the detected result to the lens control unit 313. The focus position detecting unit 309 is configured using, for example, the photo interrupter.

The lens operating unit 310 is an operating ring which is provided around a lens barrel of the lens unit 3 and receives an input of the instruction signal for instructing the change of the optical zoom in the lens unit 3 or an input of the instruction signal for instructing the adjustment of the focus position in the lens unit 3. Furthermore, the lens operating unit 310 may be a push-type switch or a lever-type switch, for example.

The lens Flash memory 311 records a control program to determine positions and movements of the zoom optical system 301, the diaphragm 304, and the focus optical system 307, respectively, and lens characteristics and various parameters of the lens unit 3. Here, the lens characteristics represent chromatic aberration, information on the angle-of-view, brightness information (f value), and information on the focal distance (for example, 50 mm to 300 mm) of the lens unit 3.

The lens communication unit 312 is a communication interface for communicating with the body communication unit 225 of the main body 2, when the lens unit 3 is attached to the main body 2. The lens communication unit 312 includes an electric contact point with the main body 2.

The lens control unit 313 is configured using the CPU or the like. The lens control unit 313 controls the operation of the lens unit 3 in response to the instruction signal from the lens operating unit 310 or the instruction signal from the main body 2. Specifically, the lens control unit 313 drives the focus driving unit 308 in response to the instruction signal from the lens operating unit 310 to adjust the focus due to the focus optical system 307 or to drive the zoom driving unit 302, thereby changing the zoom magnification of the optical zoom of the zoom optical system 301. Furthermore, the lens control unit 313 may periodically transmit lens characteristics of the lens unit 3 and identification information, which identifies the lens unit 3, to the main body 2, when the lens unit 3 is attached to the main body 2.

Next, the external device 4 will be described. The external device 4 is detachably attached to the main body 2. The external device 4 is, for example, a flash device, a sound recorder capable of inputting/outputting the voice, and a communication device that is connected to an external network according to a predetermined scheme and then transfers the image data recorded on the recording medium 221 to the outside. In addition, the external device 4 includes a communication unit 401. The communication unit 401 is a communication interface for communicating with the accessory communication unit 212 of the main body 2, when the external device 4 is attached to the main body 2.

Figure 4:
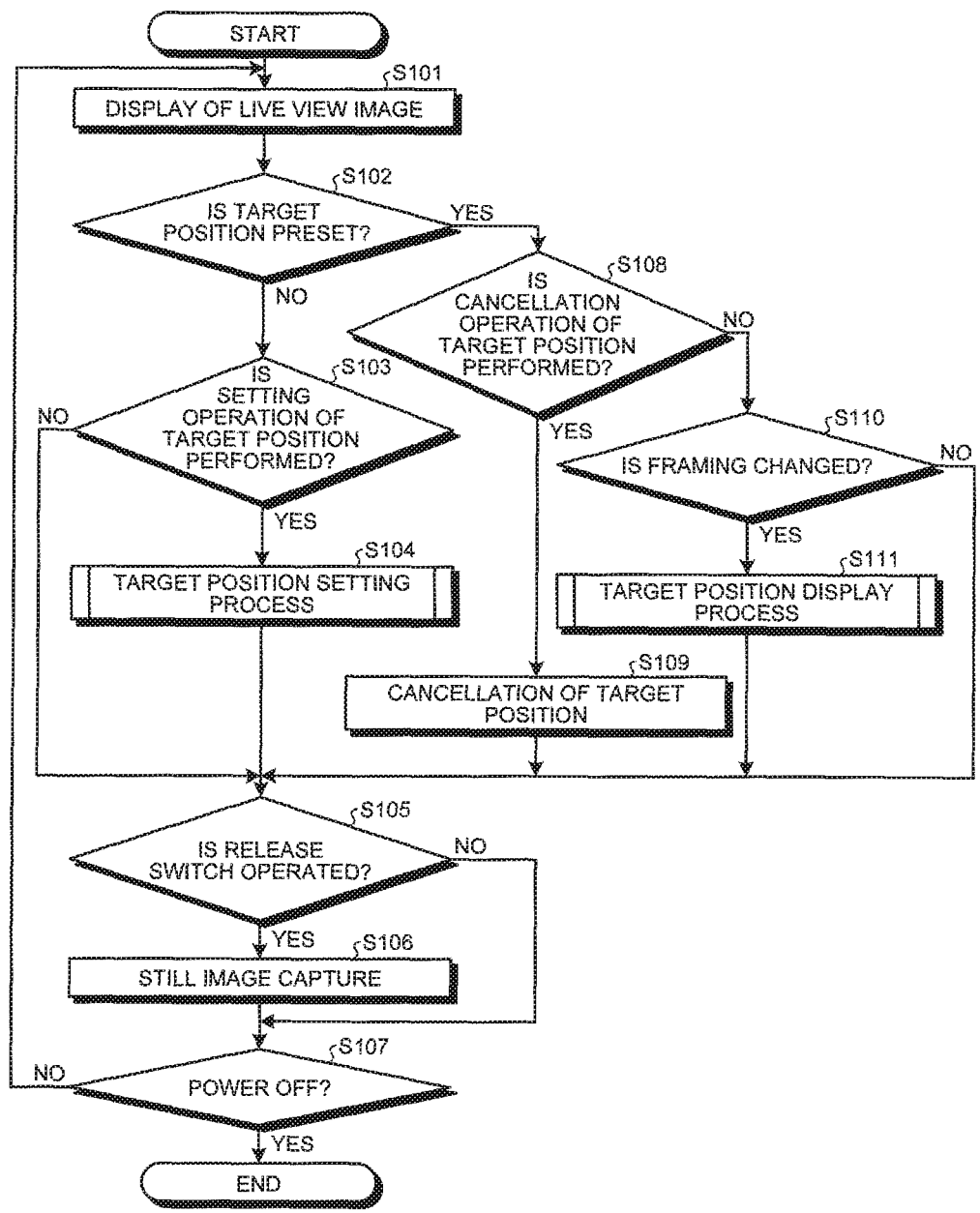
FIG. 4 is a flowchart illustrating an overview of a process to be executed by the imaging apparatus according to the embodiment of the invention.

A process to be executed by the imaging apparatus 1 having the above-described configuration will be described below. FIG. 4 is a flowchart illustrating an overview of the process to be executed by the imaging apparatus 1. Furthermore, FIG. 4 illustrates one shooting mode to be executed by the imaging apparatus 1 as an example.

Figure 5:
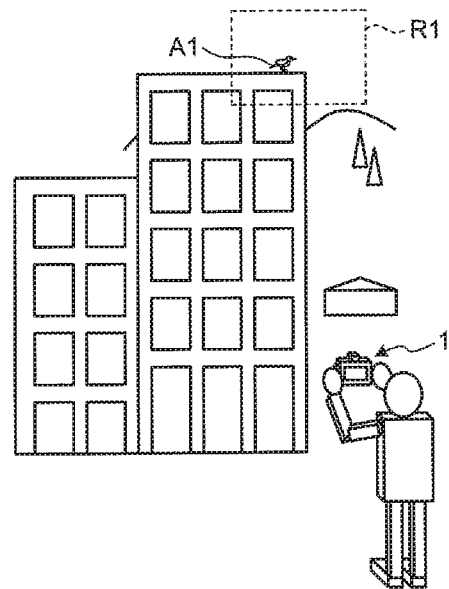
FIG. 5 is a diagram schematically illustrating a circumstance in which the imaging apparatus according to the embodiment of the invention is used.
Figure 6:
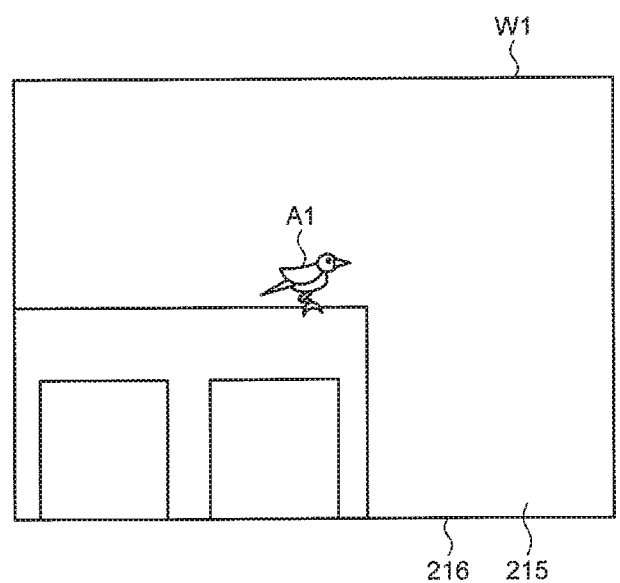
FIG. 6 is a diagram illustrating an example of a live view image which is displayed by a display unit under the circumstance of FIG. 5.

As illustrated in FIG. 4, the display control unit 227f causes the display unit 216 to display the live view image corresponding to the image data generated by the imaging device 203 (step S101). Specifically, when the user captures an object A1 using the imaging apparatus 1 under the circumstance illustrated in FIG. 5, the display control unit 227f causes the display unit 216 to display a live view image W1 corresponding to the image data generated by the imaging device 203 on a capturing area R1 equivalent to the current angle-of-view (see FIG. 6).

Subsequently, the control unit 227 determines whether the target position is preset (step S102). When the control unit 227 determines that the target position is preset (Yes in step S102), the imaging apparatus 1 proceeds to step S108 which will be described later. On the other hand, when the control unit 227 determines that the target position is not preset (No in step S102), the imaging apparatus 1 proceeds to step S103 which will be described later.

Figure 7:
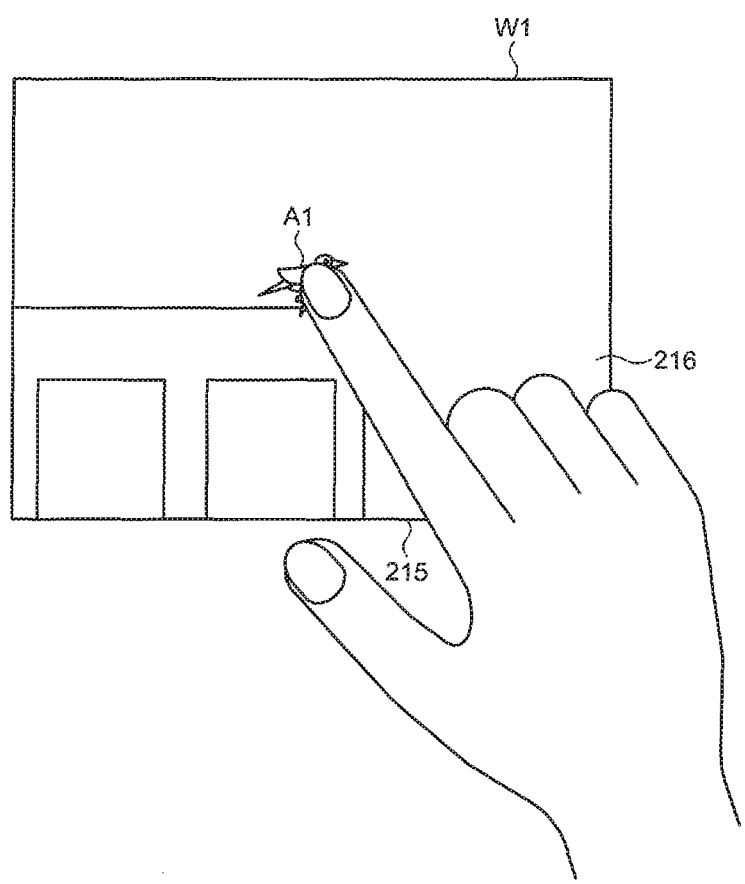
FIG. 7 is a diagram illustrating an example of an image which is displayed by the display unit of the imaging apparatus according to the embodiment of the invention.

In step S103, the control unit 227 determines whether the setting operation of the target position is performed. Specifically, as illustrated in FIG. 7, the control unit 227 determines whether the position signal is input from the touch panel 215 by the operation in which the user touches the object A1 as the target position through the touch panel 215. Furthermore, the control unit 227 may determine that the setting operation of the target position is performed, when the first release signal is input by the operation in which the user half-presses the release switch 211b. When the control unit 227 determines that the setting operation of the target position is performed (Yes in step S103), the imaging apparatus 1 proceeds to step S104 which will be described later. On the other hand, the control unit 227 determines that the setting operation of the target position is not performed (No in step S103), the imaging apparatus 1 proceeds to step S105 which will be described later.

In step S104, the imaging apparatus 1 executes the target position setting process which cuts out the area according to the position signal, which is input from the touch panel 215, from the image and then generates the image of the target position.

Figure 8:
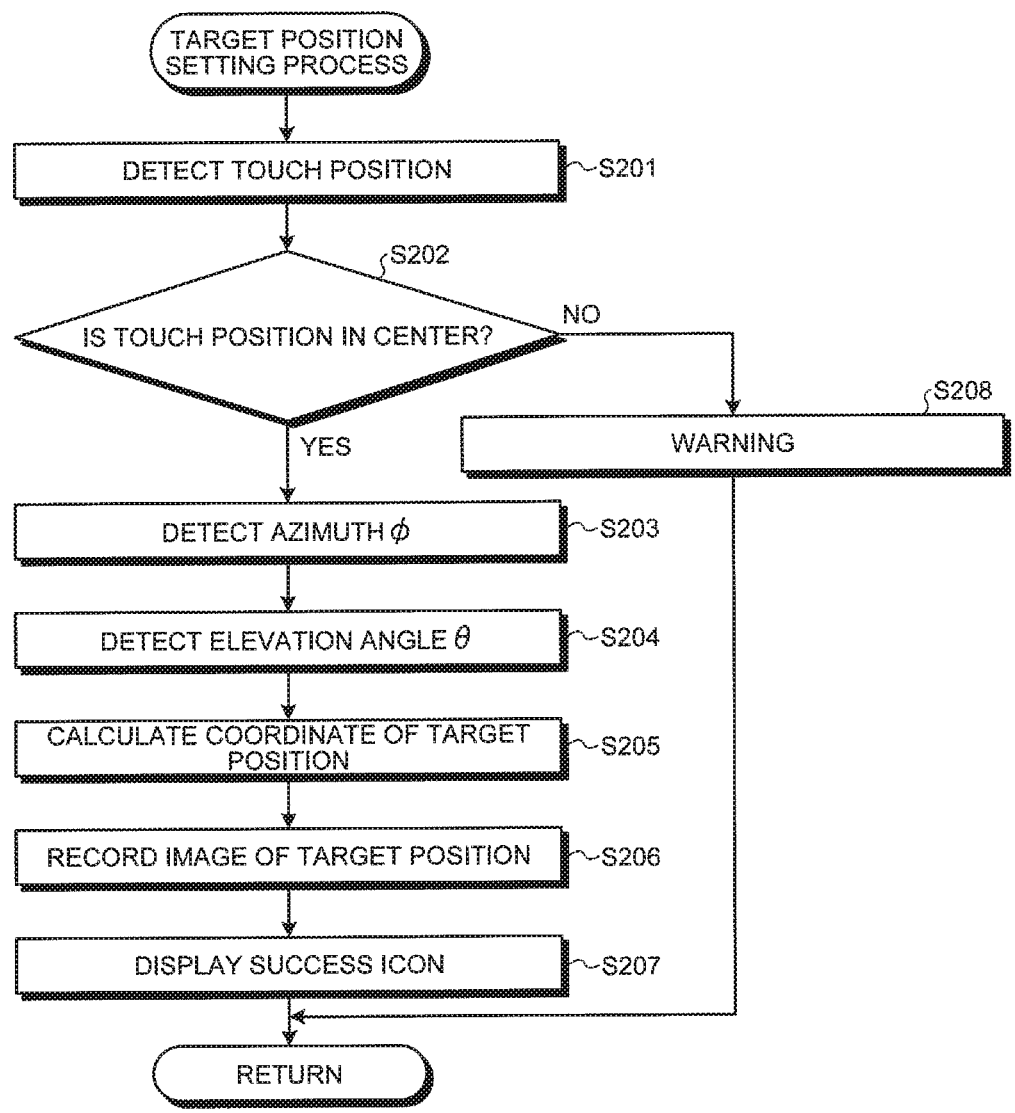
FIG. 8 is a flowchart illustrating an overview of a target position setting process illustrated in FIG. 4.

FIG. 8 is a flowchart illustrating an overview of the target position setting process of step S104. As illustrated in FIG. 8, the touch position detecting unit 227a detects the touched position (step S201).

Subsequently, the control unit 227 determines whether the position signal input from the touch panel 215 is in the center on the display screen of the display unit 216 (step S202). When the control unit 227 determines that the touched position is in the center on the display screen of the display unit 216 (Yes in step S202), the imaging apparatus 1 proceeds to step S203 which will be described later. On the other hand, when the control unit 227 determines that the touched position is not in the center on the display screen of the display unit 216 (No in step S202), the imaging apparatus 1 proceeds to step S208 which will be described later.

In step S203, the azimuth detecting unit 219 detects an azimuth angle φ of the current imaging apparatus 1.

Subsequently, the tilt angle detecting unit 218 detects an elevation angle θ of the current imaging apparatus 1 (step S204).

Thereafter, the coordinate calculating unit 227d calculates the coordinate of the target position, which is set by the target position setting unit 227b, based on the azimuth angle φ detected by the azimuth detecting unit 219 and the elevation angle θ detected by the tilt angle detecting unit 218 (step S205). Specifically, in a case where the coordinates of the target position set by the target position setting unit 227b are $X_p$, $Z_p$, and $Y_p$, respectively, and an arbitrary distance is D, the coordinate calculating unit 227d calculates the coordinates of the target position using the following Equations (1) to (3).

$$X_p = D \cdot \sin\theta \cdot \cos\phi \quad (1)$$

$$Z_p = D \cdot \sin\theta \cdot \sin\phi \quad (2)$$

$$Y_p = D \cdot \cos\theta \quad (3)$$

Subsequently, the trimming unit 207a cuts out a predetermined-sized area including the target position from the image data, which is generated by the imaging device 203, in response to the position signal, which is input from the touch panel 215, to generate the image of the target position and then records the image of the target position on the SDRAM 223 (step S206).

Thereafter, the display control unit 227f causes the display unit 216 to superimposedly display a success icon indicating that the target position is set, on the live view image (step S207). Specifically, the display control unit 227f causes the display unit 216 to display the icon indicating that the target position is set, on the live view image. Furthermore, the display control unit 227f may cause the display unit 216 to display a message or the like indicating that the target position is set, on the live view image. Moreover, the display control unit 227f may cause the display unit 216 to display a frame on the area of the target position. After step S207, the imaging apparatus 1 returns to a main routine illustrated in FIG. 4.

In step S208, the display control unit 227f causes the display unit 216 to display a message of intent to touch the center of the screen of the display unit 216, as a warning, on the live view image in which the touch position is displayed by the display unit 216. Thus, the user can intuitively find out the position to which the target position is set. After step S208, the imaging apparatus 1 returns to the main routine illustrated in FIG. 4.

Referring back to FIG. 4, the process of step S105 or later will be continuously described.

In step S105, when the release switch 211b is fully pressed (Yes in step S105), the capturing control unit 227e captures the still image by driving the shutter driving unit 202 (step S106).

Subsequently, when the power of the imaging apparatus 1 is in the OFF-state by the operation of the power switch 211a (Yes in step S107), the imaging apparatus 1 terminates this process. On the other hand, when the power of the imaging apparatus 1 is not in the OFF-state (No in step S107), the imaging apparatus 1 returns to step S101.

In step S105, when the release switch 211b is not fully pressed (No in step S105), the imaging apparatus 1 proceeds to step S107.

In step S108, the control unit 227 determines whether a setting cancellation operation of the target position is performed. Specifically, the control unit 227 determines that the setting cancellation operation of the target position is performed, when the position signal is input from the touch panel 215 or when the instruction signal indicating the setting cancellation of the target position is input from the menu switch 211d. When the control unit 227 determines that the setting cancellation operation of the target position is performed (Yes in step S108), the imaging apparatus 1 proceeds to step S109 which will be described later. On the other hand, when the control unit 227 determines that the setting cancellation operation of the target position is not performed (No in step S108), the imaging apparatus 1 proceeds to step S110 which will be described later.

In step S109, the target position setting unit 227b cancels the target. Specifically, the target position setting unit 227b deletes the image of the target position recorded by the SDRAM 223 and the coordinates of the target position associated with the image of the target position. Thereafter, the imaging apparatus 1 proceeds to step S105.

Figure 9:
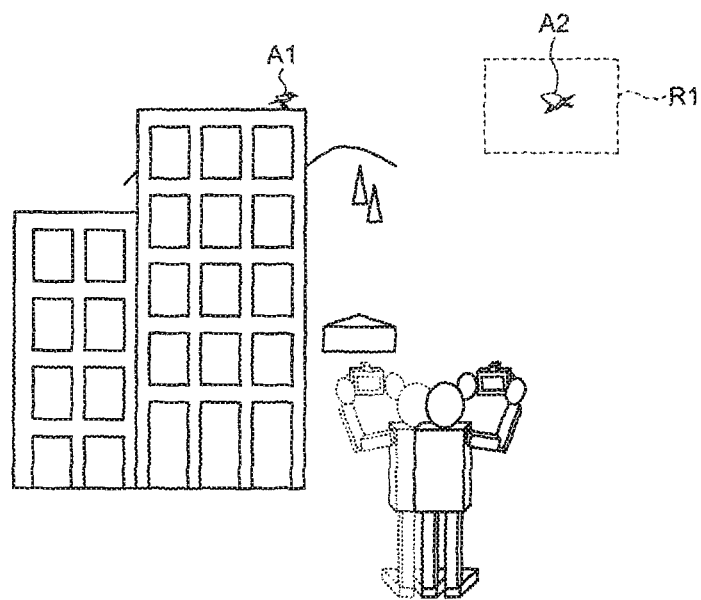
FIG. 9 is a diagram schematically illustrating a circumstance when a pan operation is performed on an imaging apparatus according to the embodiment of the invention.

In step S110, the control unit 227 determines whether a framing of the imaging apparatus 1 is changed. For example, as illustrated in FIG. 9, the control unit 227 determines whether the framing of the imaging apparatus 1 is changed, in such a manner that the object state captured by the imaging apparatus 1 is to be changed to the state of capturing the object A2 from the object A1 due to the movement of the imaging apparatus 1 by the user, based on the tilt angle or the like detected by the tilt angle detecting unit 218. When the control unit 227 determines that the framing of the imaging apparatus 1 is changed (Yes in step S110), the imaging apparatus 1 proceeds to step S111 which will be described later. On the other hand, when the control unit 227 determines that the framing of the imaging apparatus 1 is not changed (No in step S110), the imaging apparatus 1 proceeds to step S105.

In step S111, the imaging apparatus 1 executes a target position display process which guides the position of the target position in response to the changing of the framing (step S111).

Figure 10A:
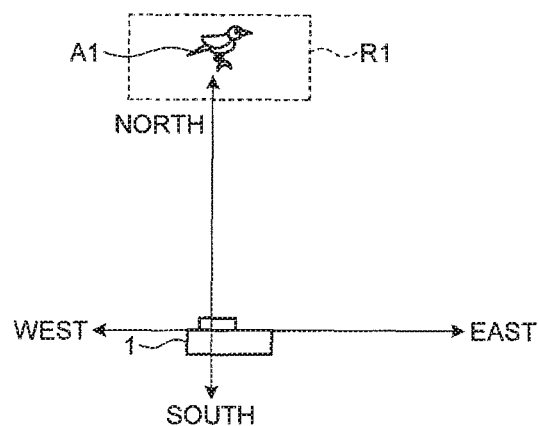
FIG. 10A is a diagram schematically illustrating an overview of a target position display process illustrated in FIG. 4.
Figure 10B:
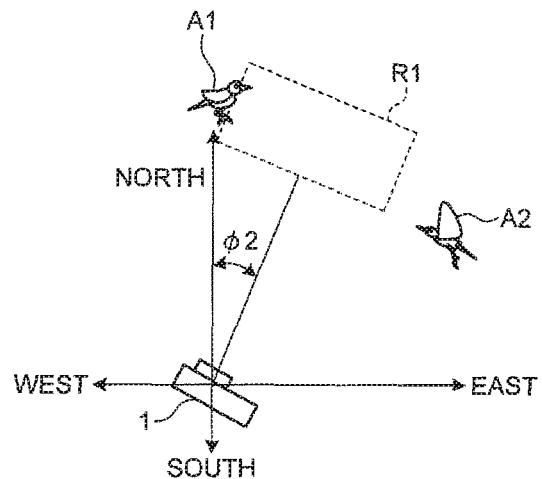
FIG. 10B is a diagram schematically illustrating an overview of the target position display process illustrated in FIG. 4.
Figure 10C:
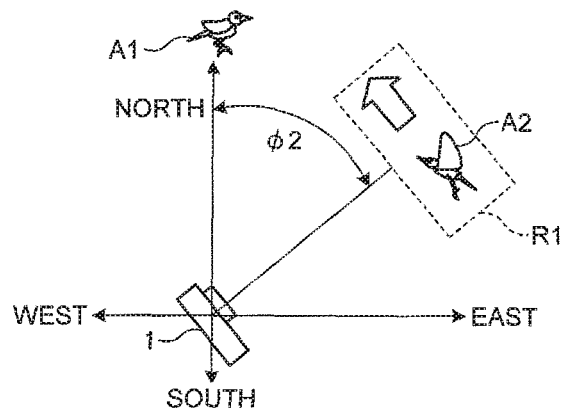
FIG. 10C is a diagram schematically illustrating an overview of the target position display process illustrated in FIG. 4.
Figure 11A:
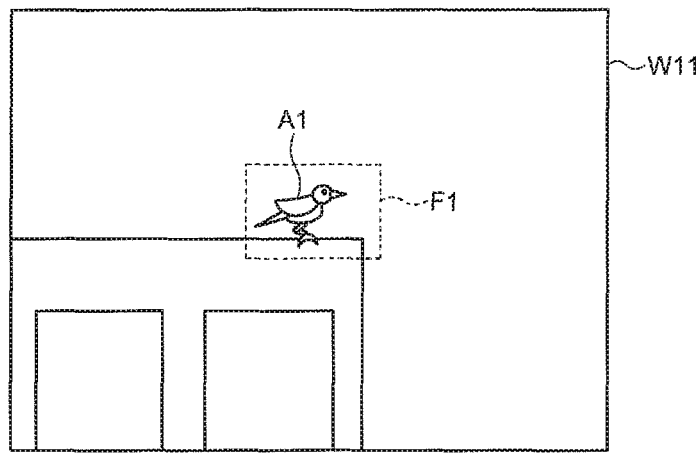
FIG. 11A is a diagram illustrating an example of an image which is displayed by the display unit in the target position display process illustrated in FIG. 4.
Figure 11B:
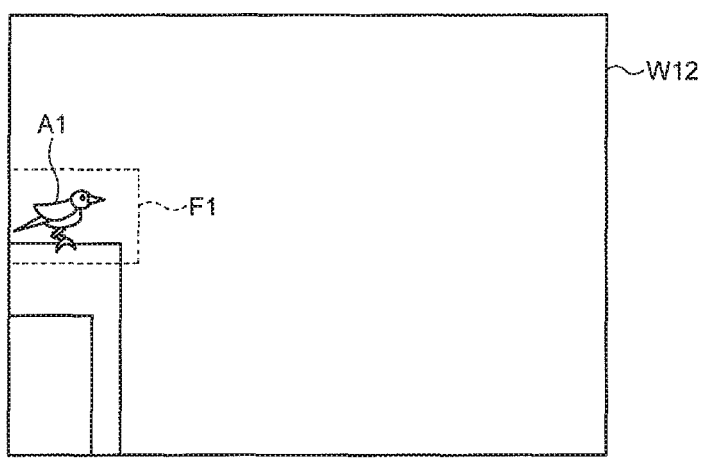
FIG. 11B is a diagram illustrating an example of an image which is displayed by the display unit in the target position display process illustrated in FIG. 4.
Figure 11C:
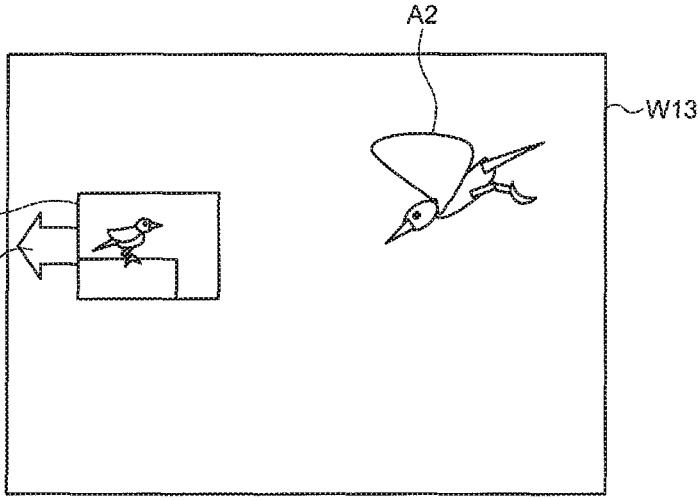
FIG. 11C is a diagram illustrating an example of an image which is displayed by the display unit in the target position display process illustrated in FIG. 4.

FIGS. 10A to 10C are a diagram schematically illustrating an overview of the target position display process to be performed by the imaging apparatus 1, respectively. FIGS. 11A to 11C are diagrams illustrating an example of the images which are displayed on the display unit 216 in the target position display process to be performed by the imaging apparatus 1, respectively. First, the overview of the target position display process will be described with reference to FIGS. 10A to 10C and FIGS. 11A to 11C.

As illustrated in FIGS. 10A to 10C and FIGS. 11A to 11C, when the user changes the framing of the imaging apparatus 1 based on the state in which the optical axis O and the north are aligned with each other and thus a capturing object is changed from an object A1 into an object A2 (FIG. 10A→FIG. 10B→FIG. 10C), the display control unit 227f causes the display unit 216 to superimposedly display the target direction M1 and the target image T1 related to the set target position on the live view image W13 (FIG. 11A→FIG. 11B→FIG. 11C), based on an azimuth angle $\phi_2$ between the reference orientation detected by the azimuth detecting unit 219 and the optical axis O. For this reason, the user can intuitively find out the capturing direction of the set target position even when the framing of the imaging apparatus 1 is changed. Moreover, in FIGS. 10A to 10C and FIGS. 11A to 11C, only the azimuth angle to be changed by the pan operation is described so as to simplify the description, but an elevation angle $\phi_2$ to be changed by the tilt operation is also applicable.

Figure 12:
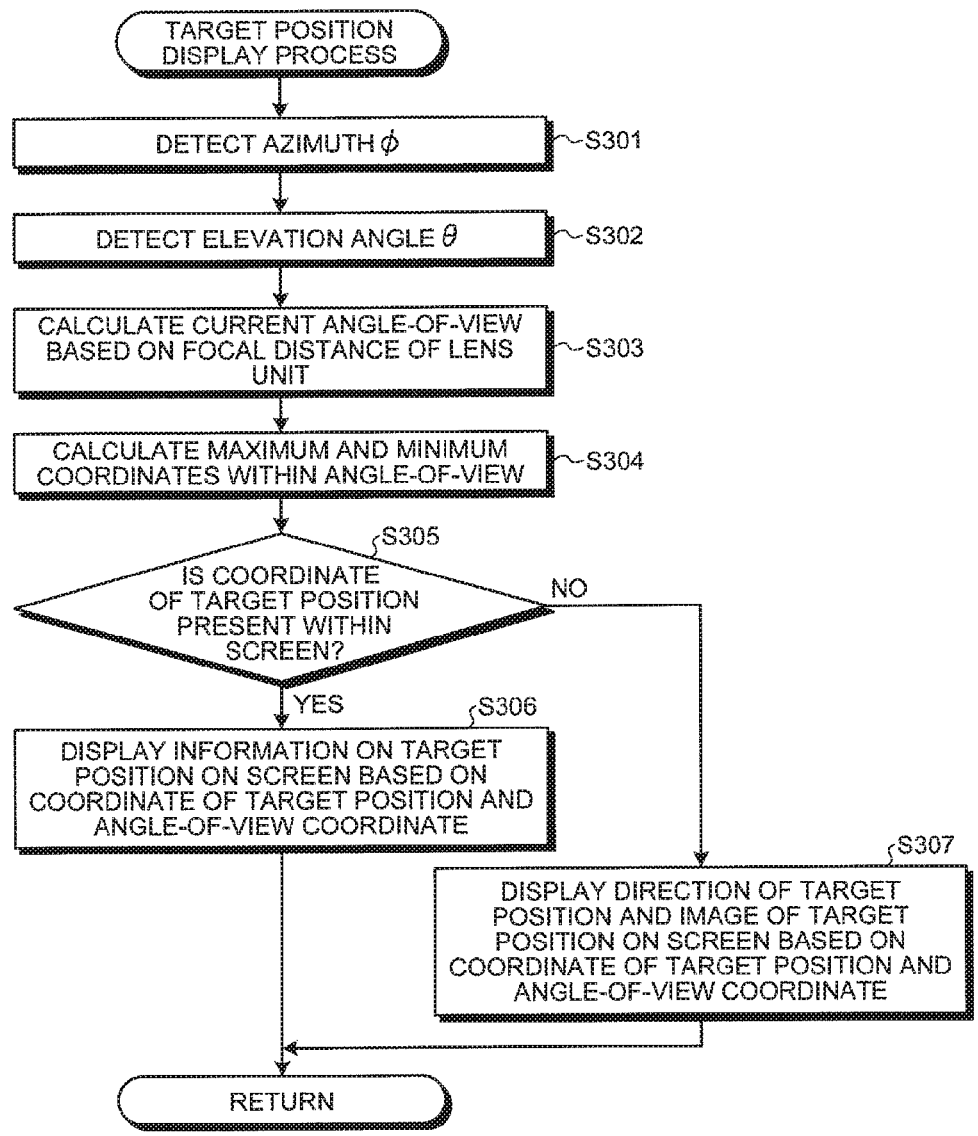
FIG. 12 is a flowchart illustrating an overview of the target position display process illustrated in FIG. 4.

Next, the target position display process of step S111 illustrated in FIG. 4, which is executed by the imaging apparatus 1, will be described. FIG. 12 is a flowchart illustrating an overview of the target position display process.

As illustrated in FIG. 12, the azimuth detecting unit 219 detects the azimuth angle φ of the current imaging apparatus 1 (step S301).

Subsequently, the tilt angle detecting unit 218 detects the elevation angle θ of the current imaging apparatus 1 (step S302).

Subsequently, the angle-of-view calculating unit 227c calculates the current angle-of-view based on the focal distance of the lens unit 3 (step S303). Specifically, the angle-of-view calculating unit 227c respectively calculates a horizontal angle-of-view $\theta_2$ and a vertical angle-of-view $\phi_2$, which are the current angle-of-view of the lens unit 3, with the direction of the optical axis O of the imaging apparatus 1 as the center, based on the current focal distance of the lens unit 3 detected by the zoom position detecting unit 303 and the sensor size of the imaging device 203.

Thereafter, the coordinate calculating unit 227d calculates four-cornered coordinates, which provide boundaries within the angle-of-view of the imaging apparatus 1, respectively, based on the azimuth angle $\phi_2$ detected by the azimuth detecting unit 219 and the elevation angle $\phi_2$ detected by the tilt angle detecting unit 218 (step S304).

Figure 13:
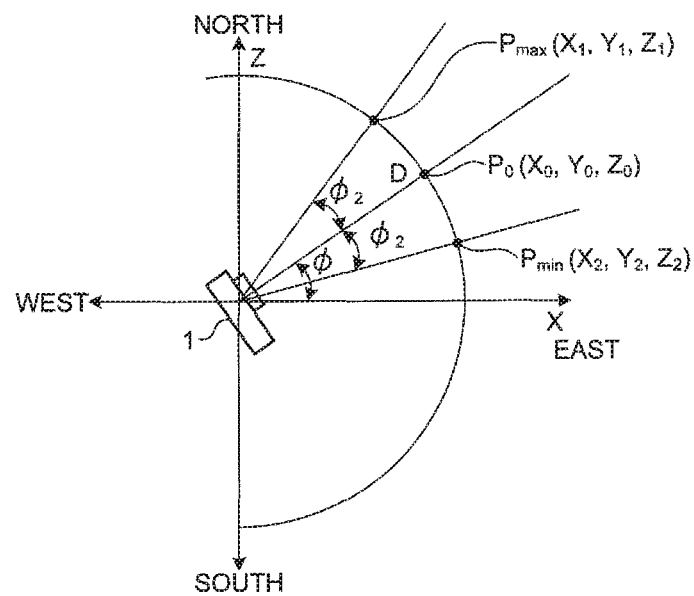
FIG. 13 is a diagram schematically illustrating an overview when a coordinate calculating unit of the imaging apparatus according to the embodiment of the invention calculates coordinates of a vertical angle-of-view of the imaging apparatus.
Figure 14:
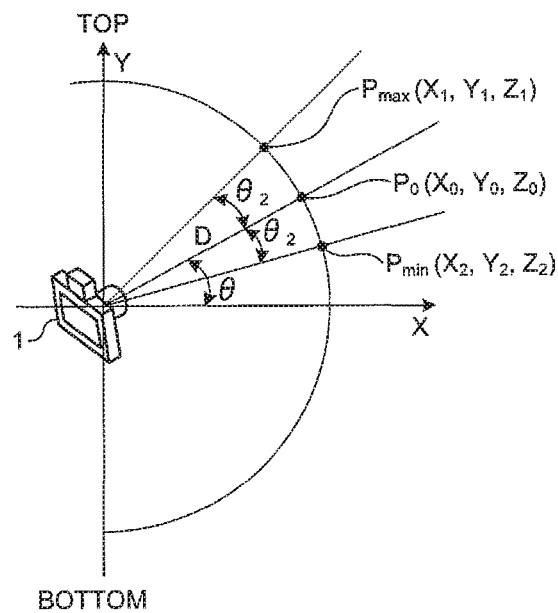
FIG. 14 is a diagram schematically illustrating an overview when the coordinate calculating unit of the imaging apparatus according to the embodiment of the invention calculates coordinates of a horizontal angle-of-view of the imaging apparatus.
Figure 15:
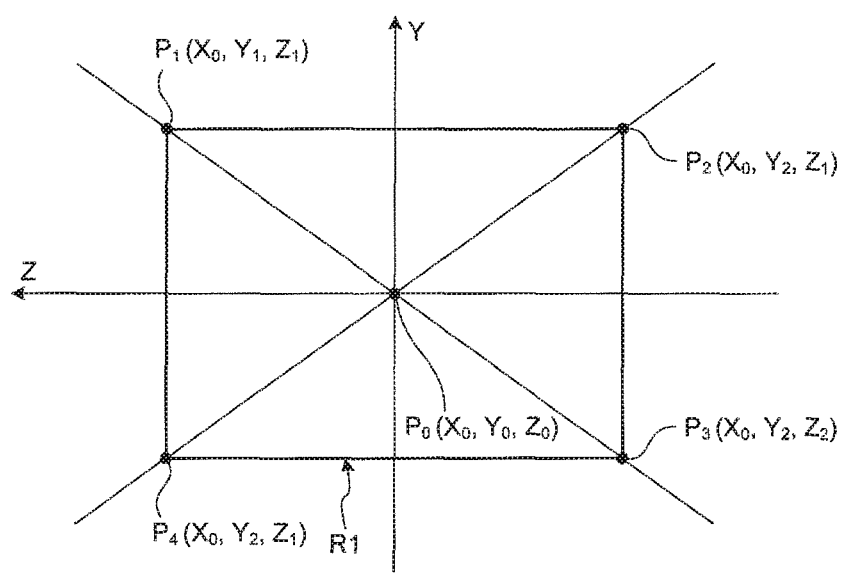
FIG. 15 is a diagram which is obtained by two-dimensionally converting the coordinates of the imaging apparatus according to the embodiment of the invention.

FIG. 13 is a diagram schematically illustrating an overview when the coordinate calculating unit 227d calculates coordinates of the vertical angle-of-view of the imaging apparatus 1. FIG. 14 is a diagram schematically illustrating an overview when the coordinate calculating unit 227d calculates coordinates of the horizontal angle-of-view of the imaging apparatus 1. FIG. 15 is a diagram which is obtained by two-dimensionally converting the coordinates of angle-of-view of the imaging apparatus 1.

As illustrated in FIGS. 13 to 15, the coordinate calculating unit 227d calculates the maximum and minimum coordinates of the current angle-of-view with the direction of the optical axis θ of the imaging apparatus 1 as the center using the following Equations (4) to (9), in a case where, in the current angle-of-view of the imaging apparatus 1, the maximum coordinates are $X_{max}$, $Z_{max}$, and $Y_{max}$, the minimum coordinates are $X_{min}$, $Z_{min}$, and $Y_{min}$, and the arbitrary distance is D.

$$X_{max} = D \cdot \sin(\theta+\theta_2) \cdot \cos(\phi+\phi_2) \quad (4)$$

$$Z_{max} = D \cdot \sin(\theta+\theta_2) \cdot \sin(\phi+\phi_2) \quad (5)$$

$$Y_{max} = D \cdot \cos(\theta+\theta_2) \quad (6)$$

$$X_{min} = D \cdot \sin(\theta-\theta_2) \cdot \cos(\phi-\phi_2) \quad (7)$$

$$Z_{min} = D \cdot \sin(\theta-\theta_2) \cdot \sin(\phi-\phi_2) \quad (8)$$

$$Y_{min} = D \cdot \cos(\theta-\theta_2) \quad (9)$$

$$\theta_2 > 0 \quad (10)$$

As described above, the coordinate calculating unit 227d calculates the maximum and minimum coordinates of the current angle-of-view with the direction of the optical axis O of the imaging apparatus 1 as the center, using the above Equations (4) to (10).

In step S305, when the coordinates of the target position is present within the current screen displayed by the display unit 216 (Yes in step S305), the display control unit 227f causes the display unit 216 to display the information on the target position on the live view image, based on the coordinates of the target position and the coordinates of the current angle-of-view of the imaging apparatus 1 (step S306). Specifically, as illustrated in FIG. 11B, the display control unit 227f causes the display unit 216 to display the area of the target position with a frame F1 on the live view image W12, as information on the target position. For this reason, the user can intuitively find out the set target position. After step S306, the imaging apparatus 1 returns to the main routine illustrated in FIG. 4.

In step S305, the coordinate of the target position is not present within the current screen displayed by the display unit 216 (No in step S305), the display control unit 227f causes the display unit 216 to display the direction of the target position and the image of the target position within the screen of the live view image, based on the coordinates of the target position and the coordinates of the angle-of-view (step S307). Specifically, as illustrated in FIG. 11C, the display control unit 227f causes the display unit 216 to display the direction M1 of the target position and the target image T1 of the target position on the live view image W13. Therefore, even when the capturing area of the imaging apparatus 1 is changed by allowing the user to perform the pan operation or the tilt operation on the imaging apparatus 1, the user can intuitively find out the position of the original capturing area and can easily return to the original capturing area. After step S307, the imaging apparatus 1 returns to the main routine illustrated in FIG. 4.

According to the embodiment of the invention described above, the display control unit 227f causes the display unit 216 to superimposedly display the target information, which indicates the direction up to the target position from the optical axis direction of the imaging apparatus 1, on the live view image, based on the current azimuth angle of the imaging apparatus 1 detected by the azimuth detecting unit 219 and the elevation angle detected by the tilt angle detecting unit 218. For this reason, even when the capturing area of the imaging apparatus 1 is changed, the user can intuitively find out the position of the original capturing area.

Figure 16A:
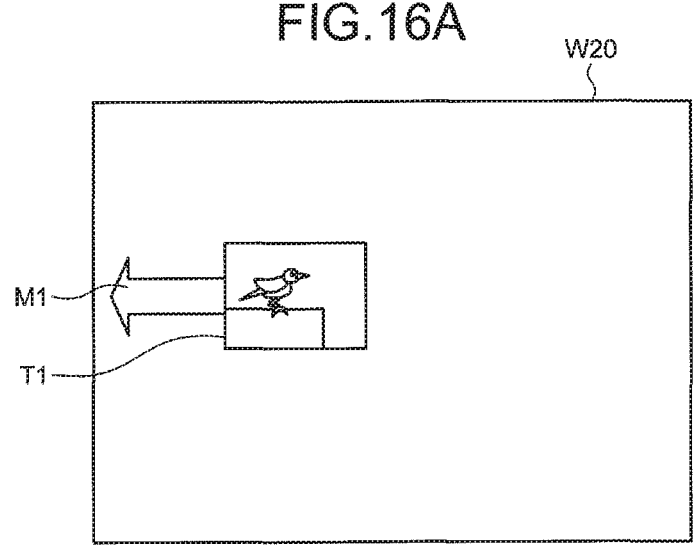
FIG. 16A is a diagram illustrating an example of an image which is displayed by the display unit of the imaging apparatus according to a modified example of the embodiment of the invention.
Figure 16B:
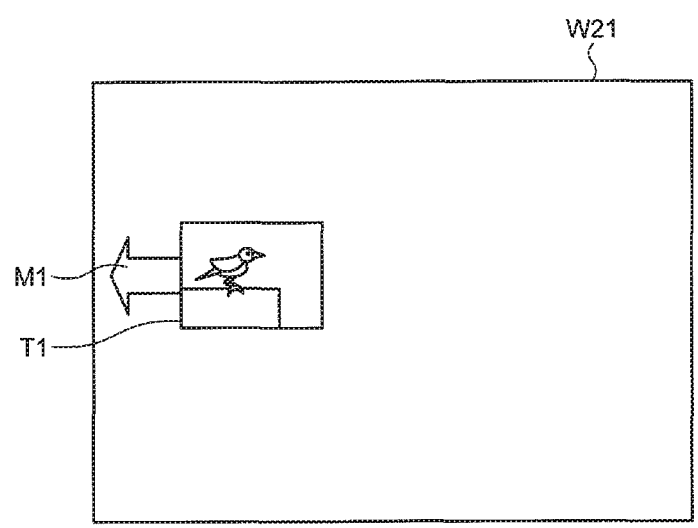
FIG. 16B is a diagram illustrating an example of an image which is displayed by the display unit of the imaging apparatus according to the modified example of the embodiment of the invention.

In addition, according to the embodiment of the invention, the display area of the target information may be changed. Specifically, as illustrated in FIGS. 16A and 16B, the display control unit 227f may determine the size of the display area of the target information in response to the distance from the position with reference to the direction of the optical axis O of the imaging apparatus 1 to the target position, based on the current azimuth angle of the imaging apparatus 1 detected by the azimuth detecting unit 219 and the elevation angle detected by the tilt angle detecting unit 218 (FIG. 16A→FIG. 16B). Therefore, the user can easily find out the distance up to the target position by confirming the size of the display area of the target information in an image W20 and an image W21.

Furthermore, in the embodiment of the invention, the coordinate calculating unit 227d calculates the coordinates of the target position based on the tilt angle detected based on the horizontal plane by the tilt angle detecting unit 218 and the direction detected based on the north by the azimuth detecting unit 219, but may calculate the coordinates of the target position and the coordinates of the angle-of-view of the imaging apparatus 1 based on the tilt angle detected by the tilt angle detecting unit 218 and the direction detected by the azimuth detecting unit 219, with reference to the time in which the target position is set by the target position setting unit 227b, for example. Therefore, since the coordinate of a horizontal direction (Z-axis) and the coordinate of a vertical direction (Y-axis) are only calculated, it is possible to calculate simply and easily the coordinates of the target position and the coordinates of the angle-of-view of the imaging apparatus 1.

Other Embodiments

Furthermore, the invention is not limited to only the above-described embodiment.

For example, an electronic viewfinder other than the display unit may be provided in the main body so as to be applied to this embodiment. In this case, it is more preferable that the hue of the live view image differ between the display unit and the electronic viewfinder.

In addition, the main body and the lens unit may be integrally formed.

In addition, the imaging apparatus according to the present embodiment may be applied to electronic equipments such as a digital camera to which accessories can be attached, a digital video camera, and a mobile phone and a tablet mobile device which have an image capturing function in addition to a digital single-lens reflex camera.

Furthermore, in the description of the flowchart in this specification, a sequence relation of processes between steps is specified using an expression such as "first", "thereafter", and "subsequently". However, a sequence of processes necessary to embody the invention is not uniquely decided by these expressions. In other words, the sequence of processes in a flowchart described in this specification may be changed within a consistent range.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic device, comprising:
   an imaging device that captures an image of an object and generates image data of the object;
   a tilt angle detector that detects a tilt angle of the imaging device with respect to a horizontal plane;
   an azimuth detector that detects an azimuth angle between a reference orientation based on a preset orientation and an optical axis of the imaging device;
   a display controller that causes a display to display target information indicating a direction to a target position for instructing a position of a capturing area of the imaging device in an image corresponding to the image data, with the optical axis of the imaging device being a reference, based on the tilt angle detected by the tilt angle detector and the azimuth angle detected by the azimuth detector;
   a memory that records focal distance information on a focal distance of the imaging device;
   an angle-of-view calculating processor that calculates an angle-of-view of the imaging device, based on the focal distance information recorded by the memory; and
   a coordinate calculating processor that calculates a coordinate of the target position and coordinates of a boundary of the angle-of-view calculated by the angle-of-view calculating processor, based on the tilt angle detected by the tilt angle detector and the azimuth angle detected by the azimuth detector,
   wherein the display controller causes the display to display the target information, when the coordinate of the target position calculated by the coordinate calculating processor is not within the angle-of-view.

2. The electronic device according to claim 1, wherein the display controller determines a size of a display area of the target information according to a distance from a position based on an optical axis direction of the imaging device to the target position.

3. The electronic device according to claim 1, further comprising:
   a trimming image processor that cuts out an area including at least the target position from the image data and generates a trimming image,
   wherein the display controller causes the display to display the trimming image with the target information.

4. The electronic device of claim 1, wherein the coordinate calculating processor calculates coordinates of four corners providing the boundary of the angle-of-view calculated by the angle-of-view calculating processor.

5. A guide displaying method that is executed by an electronic device, the method comprising:
   capturing an image of an object by an imaging device and generating image data of the object;
   detecting a tilt angle of the electronic device with respect to a horizontal plane;
   detecting an azimuth angle between a reference orientation based on a preset orientation and an optical axis of the imaging device;
   instructing a display to display target information indicating a direction to a target position for instructing a position of a capturing area of the imaging device in an image corresponding to the image data, with the optical axis of the imaging device being a reference, based on the tilt angle and the azimuth angle;
   recording focal distance information on a focal distance of the imaging device;
   calculating an angle-of-view of the imaging device, based on the focal distance information; and
   calculating a coordinate of the target position and coordinates of a boundary of the angle-of-view based on the tilt angle and the azimuth angle,
   wherein the display is instructed to display the target information when the coordinate of the target position is not within the angle-of-view.

6. A non-transitory computer readable recording medium on which an executable computer program is recorded, wherein the computer program instructs a processor of an information device capable of communicating via a network, to execute:
   capturing an image of an object by an imaging device and generating image data of the object;
   detecting a tilt angle of the electronic device with respect to a horizontal plane;
   detecting an azimuth angle between a reference orientation based on a preset orientation and an optical axis of the imaging device;
   instructing a display to display target information indicating a direction to a target position for instructing a position of a capturing area of the imaging device in an image corresponding to the image data, with the optical axis of the imaging device being a reference, based on the tilt angle and the azimuth angle;
   recording focal distance information on a focal distance of the imaging device;
   calculating an angle-of-view of the imaging device, based on the focal distance information; and calculating a coordinate of the target position and coordinates of a boundary of the angle-of-view based on the tilt angle and the azimuth angle, wherein the display is instructed to display the target information when the coordinate of the target position is not within the angle-of-view.

7. An imaging system, comprising:

an imaging device that captures an image of an object and generates image data of the object;

a tilt angle detector that detects a tilt angle of the imaging device with respect to a horizontal plane;

an azimuth detector that detects an azimuth angle between a reference orientation based on a preset orientation and an optical axis of the imaging device;

a display controller that instructs a display to display target information indicating a direction to a target position for instructing a position of a capturing area of the imaging device in an image corresponding to the image data, with the optical axis of the imaging device being a reference, based on the tilt angle detected by the tilt angle detector and the azimuth angle detected by the azimuth detector;

a memory that records focal distance information on a focal distance of the imaging device;

an angle-of-view calculating processor that calculates an angle-of-view of the imaging device, based on the focal distance information recorded by the memory; and a coordinate calculating processor that calculates a coordinate of the target position and coordinates of a boundary of the angle-of-view calculated by the angle-of-view calculating processor, based on the tilt angle detected by the tilt angle detector and the azimuth angle detected by the azimuth detector, wherein the display controller causes the display to display the target information, when the coordinate of the target position calculated by the coordinate calculating processor is not within the angle-of-view.

8. The imaging system of claim 7, wherein the display controller communicates with the tilt angle detector and the azimuth angle detector to receive data corresponding to the detected tilt angle and the detected azimuth angle.

* * * * *